US006941652B2

(12) United States Patent
Echols et al.

(10) Patent No.: US 6,941,652 B2
(45) Date of Patent: *Sep. 13, 2005

(54) METHODS OF FABRICATING A THIN-WALL EXPANDABLE WELL SCREEN ASSEMBLY

(75) Inventors: Ralph H. Echols, Dallas, TX (US); Anthony D. Simone, Greensboro, NC (US); Sam A. Hopkins, Germanton, NC (US)

(73) Assignee: Halliburton Energy Services, Inc., Houston, TX (US)

( * ) Notice: Subject to any disclaimer, the term of this patent is extended or adjusted under 35 U.S.C. 154(b) by 124 days.

This patent is subject to a terminal disclaimer.

(21) Appl. No.: 10/189,100

(22) Filed: Jul. 2, 2002

(65) Prior Publication Data

US 2002/0178582 A1 Dec. 5, 2002

Related U.S. Application Data

(60) Continuation of application No. 10/109,154, filed on Mar. 28, 2002, now Pat. No. 6,619,401, which is a division of application No. 09/574,658, filed on May 18, 2000, now Pat. No. 6,415,509.

(51) Int. Cl.[7] .................................................. B23P 15/16

(52) U.S. Cl. ................................ 29/896.62; 29/896.61; 29/469; 166/227; 166/233; 166/380

(58) Field of Search ......................... 29/896.61, 896.62, 29/428, 469, 896.21; 166/207, 227, 233, 236, 380

(56) References Cited

U.S. PATENT DOCUMENTS

| | | | | | |
|---|---|---|---|---|---|
| 846,482 | A | * | 3/1907 | Layne | 228/144 |
| 1,569,098 | A | | 1/1926 | Mark | |
| 1,713,881 | A | * | 5/1929 | Seifert | 29/890.14 |
| 1,800,642 | A | * | 4/1931 | Johnson | 228/182 |

(Continued)

FOREIGN PATENT DOCUMENTS

| | | |
|---|---|---|
| SU | 1066628 A | 1/1984 |
| WO | WO 93/25800 | 12/1993 |

OTHER PUBLICATIONS

International Search Report: Application No. PCT/US01/15064.

Halliburton "Poroplus" Sand Control Screen Brochure (Dec. 1999).

Purolator "Poroplus" Sand Control Screen Brochure, undated.

Purolator "Poroplus" Sand Control Screen Brochure (1997).

*Primary Examiner*—Essama Omgba
(74) *Attorney, Agent, or Firm*—J. Richard Konneker

(57) ABSTRACT

An expandable well screen has a desirable thin-wall construction together with a simplified fabrication method. In fabricating the screen, a flexible sheet of metal mesh filter media is diffusion bonded to an inner side of a perforated metal sheet which is then deformed to a tubular shape to form a filter structure having an outer perforated tubular shroud interiorly lined with the filter media. The tubular filter structure is telescoped onto a perforated base pipe and has its opposite ends sealingly secured thereto to complete the expandable well screen.

26 Claims, 3 Drawing Sheets

U.S. PATENT DOCUMENTS

| | | | | | |
|---|---|---|---|---|---|
| 2,118,171 | A | * | 5/1938 | Darst | 166/236 |
| 2,830,359 | A | * | 4/1958 | Reinshagen | 29/896.62 |
| 2,835,328 | A | | 5/1958 | Thompson | |
| 2,858,894 | A | | 11/1958 | Akeyson | |
| 2,877,852 | A | | 3/1959 | Bashara | |
| 3,057,481 | A | | 10/1962 | Pall | |
| 3,087,560 | A | | 4/1963 | Dodson | |
| 3,674,154 | A | | 7/1972 | Sicard | |
| 3,679,062 | A | | 7/1972 | Burkhart | |
| 3,747,770 | A | | 7/1973 | Zentis | |
| 3,816,894 | A | * | 6/1974 | Howard et al. | 29/896.62 |
| 3,908,256 | A | * | 9/1975 | Smith, III | 140/71 R |
| 3,958,634 | A | * | 5/1976 | Smith, III | 166/233 |
| 4,058,464 | A | | 11/1977 | Rogers | |
| 4,167,972 | A | * | 9/1979 | Sears | 166/233 |
| 4,204,967 | A | | 5/1980 | Bannister | |
| 4,282,100 | A | | 8/1981 | Kunishio et al. | |
| 4,293,414 | A | | 10/1981 | Gianneli | |
| 4,327,859 | A | * | 5/1982 | Theysohn | 228/107 |
| 4,406,326 | A | * | 9/1983 | Wagner | 166/227 |
| 4,977,958 | A | * | 12/1990 | Miller | 166/205 |
| 5,088,554 | A | * | 2/1992 | Arterbury et al. | 166/228 |
| 5,190,102 | A | * | 3/1993 | Arterbury et al. | 166/228 |
| 5,200,072 | A | | 4/1993 | Frejborg et al. | |
| 5,293,935 | A | | 3/1994 | Arterbury et al. | |
| 5,404,954 | A | | 4/1995 | Whitebay et al. | |
| 5,411,084 | A | | 5/1995 | Padden | |
| 5,587,074 | A | | 12/1996 | Lynch et al. | |
| 5,611,399 | A | * | 3/1997 | Richard et al. | 166/230 |
| 5,624,560 | A | * | 4/1997 | Voll et al. | 210/486 |
| 5,664,628 | A | | 9/1997 | Kuehler et al. | |
| 5,711,879 | A | * | 1/1998 | Carlson | 210/497.01 |
| 5,782,299 | A | | 7/1998 | Simone et al. | |
| 5,833,853 | A | * | 11/1998 | Carlson | 210/497.01 |
| 5,899,271 | A | | 5/1999 | Simone et al. | |
| 5,901,789 | A | * | 5/1999 | Donnelly et al. | 166/381 |
| 5,909,773 | A | | 6/1999 | Koehler et al. | |
| 5,937,944 | A | | 8/1999 | Simone et al. | |
| 5,980,744 | A | * | 11/1999 | Gagnon et al. | 210/497.01 |
| 6,012,522 | A | * | 1/2000 | Donnelly et al. | 166/276 |
| 6,109,349 | A | | 8/2000 | Simone et al. | |
| 6,263,966 | B1 | * | 7/2001 | Haut et al. | 166/278 |
| 6,302,663 | B1 | * | 10/2001 | Schuller et al. | 417/554 |
| 6,305,468 | B1 | * | 10/2001 | Broome et al. | 166/233 |
| 6,352,111 | B1 | * | 3/2002 | Bode et al. | 166/265 |
| 6,382,318 | B1 | * | 5/2002 | Whitlock | 166/278 |
| 6,390,192 | B2 | * | 5/2002 | Doesburg et al. | 166/230 |
| 6,415,509 | B1 | * | 7/2002 | Echols et al. | 29/896.62 |
| 6,457,518 | B1 | * | 10/2002 | Castano-Mears et al. | 166/207 |
| 6,576,032 | B2 | * | 6/2003 | Maus | 55/446 |
| 6,612,481 | B2 | * | 9/2003 | Bode | 228/143 |
| 6,619,401 | B2 | * | 9/2003 | Echols et al. | 166/369 |
| 6,668,920 | B2 | * | 12/2003 | Setterberg, Jr. | 166/228 |
| 6,799,686 | B2 | * | 10/2004 | Echols et al. | 210/402 |
| 2001/0003313 | A1 | | 6/2001 | Doesburg et al. | |

* cited by examiner

METHODS OF FABRICATING A THIN-WALL EXPANDABLE WELL SCREEN ASSEMBLY

CROSS-REFERENCE TO RELATED APPLICATION

This application is a continuation of U.S. application Ser. No. 10/109,154, filed on Mar. 28, 2002 now U.S. Pat. No. 6,619,401 and entitled "METHODS OF COMPLETING A SUBTERRANEAN WELL", which was a division of U.S. application Ser. No. 09/574,658, filed on May 18, 2000 now U.S. Pat. No. 6,415,509 and entitled "METHODS OF FABRICATING A THIN-WALL EXPANDABLE WELL SCREEN ASSEMBLY" (As amended), such applications being hereby incorporated by reference herein in their entireties. Further, this application discloses subject matter similar to that disclosed in copending U.S. application Ser. No. 09/565,899 filed on May 5, 2000, entitled "EXPANDABLE WELL SCREEN", and having Ana M. Castano-Mears, John C. Gano and Ralph H. Echols as inventors. Such copending is also hereby incorporated by reference herein in its entirety.

BACKGROUND OF THE INVENTION

The present invention generally relates to filtration apparatus and, in a preferred embodiment thereof, more particularly relates to a specially configured expandable well screen assembly for use in a subterranean wellbore, and associated methods of fabricating the well screen.

It is useful in some circumstances to be able to convey generally tubular equipment into a subterranean wellbore to a predetermined location therein, and then outwardly expand the equipment in the wellbore. For example, a restriction in the wellbore may prevent the equipment in its expanded configuration from passing through that part of the wellbore, but the equipment may pass through the restriction in its retracted configuration. In one application of this principle, it is known to use expandable well screens in wellbores.

An example of the potential usefulness of expandable equipment in a wellbore is where the wellbore intersects a productive, relatively unconsolidated formation. It is desirable in many situations to be able to utilize a well screen to filter production fluid from the formation, while foregoing the expense of cementing casing in the wellbore and performing a gravel packing operation. Unfortunately, without any radial support the unconsolidated formation would likely collapse into the wellbore, causing additional expense and loss of revenue. Conventional nonexpandable well screens must necessarily be smaller than the wellbore in order to be conveyed therethrough, and so they are incapable of providing any radial support for an unconsolidated formation.

Previously proposed expandable well screens have associated therewith several problems, limitations and disadvantages. For example, they are typically not designed for contacting and providing radial support for a formation, and are thus unsuited for this purpose. Additionally, at least one previously proposed well screen assembly construction has a multi-layer configuration in which various tubular elements must be telescoped with one another and then intersecured. The relative structural complexity of this previously proposed expandable well screen assembly, and the necessity of using multiple steps to fabricate it, undesirably increases its fabrication cost. Moreover, since the assembly portion outwardly circumscribing a perforated base pipe portion of the well screen has several layers, the maximum permissible unexpanded diameter of the base pipe is undesirably reduced due to the necessity of limiting the outer diameter of the well screen assembly to a maximum value determined by limiting well dimensions. Due to this reduced unexpanded diameter of the base pipe, operational expansion thereof undesirably increases the expansion stresses thereon and reduces the maximum available expanded diameter thereof.

AS can readily be seen from the foregoing, a need exists for an improved expandable well screen, and associated fabrication methods, that eliminate or at least substantially reduce the above-mentioned problems, limitations and disadvantages of previously proposed well screen constructions as generally described above. It is to this need that the present invention is directed.

SUMMARY OF THE INVENTION

In carrying out principles of the present invention, in accordance with a preferred embodiment thereof, a specially designed well screen is provided and is useable in a subterranean wellbore as a particulate filtering structure. While the well screen is representatively of an expandable construction, it may also be advantageously utilized in applications where it is not necessary or desirable to expand the well screen. Additionally, principles of the present invention may be used in filtration applications other than in the representatively illustrated downhole well screen application.

According to an aspect of the invention, the well screen includes a perforated tubular base pipe coaxially circumscribed by a specially designed thin-walled tubular filter structure anchored to the base pipe and defined by a perforated tubular outer protective shroud having a tubular filter media sheet secured directly to its inner side surface. The construction of the filter structure facilitates the radial expansion of the well screen, provides it with a greater central flow area for a given maximum outer well screen diameter, simplifies the fabrication of the well screen, and reduces the fabrication cost of the well screen.

Preferably, the filter structure is of a metal mesh material and has relatively coarse radially outer and inner filter material layers between which a relatively fine intermediate filter material layer is sandwiched. The perforated tubular outer shroud member has a sidewall opening area percentage which is representatively in the range of from about 10 percent to about 30 percent, and is preferably about 23 percent.

According to a fabricational aspect of the invention in a preferred embodiment thereof, the tubular outer shroud/filter subassembly is formed by providing a flat perforated plate and placing on a side thereof a stack of individual metal mesh sheets. A diffusion bonding process is preferably used to bond the individual sheets to one another, and bond the sheet stack to the facing side of the perforated plate. Preferably, a single bonding process is used, although a first bonding step could be used to bond the sheets together, and a subsequent bonding step used to secure the bonded sheet stack to the perforated plate.

After peripherally trimming the flat plate/sheet stack subassembly to desired assembly dimensions, the plate/sheet stack assembly is deformed to a tubular configuration that defines the filter media-lined tubular shroud structure. A seam weld is placed along abutting edge portions of the now tubular perforated plate to hold it, and the tubular filter media structure which lines it and is directly secured to its inner side surface, in their finished tubular configurations.

The finished outer tubular shroud/filter structure is then placed coaxially around the perforated base pipe and suitably anchored thereto, for example by welding the opposite ends of the shroud to the base pipe, to complete the fabrication of the well screen.

DETAILED DESCRIPTION

Figure 1A:
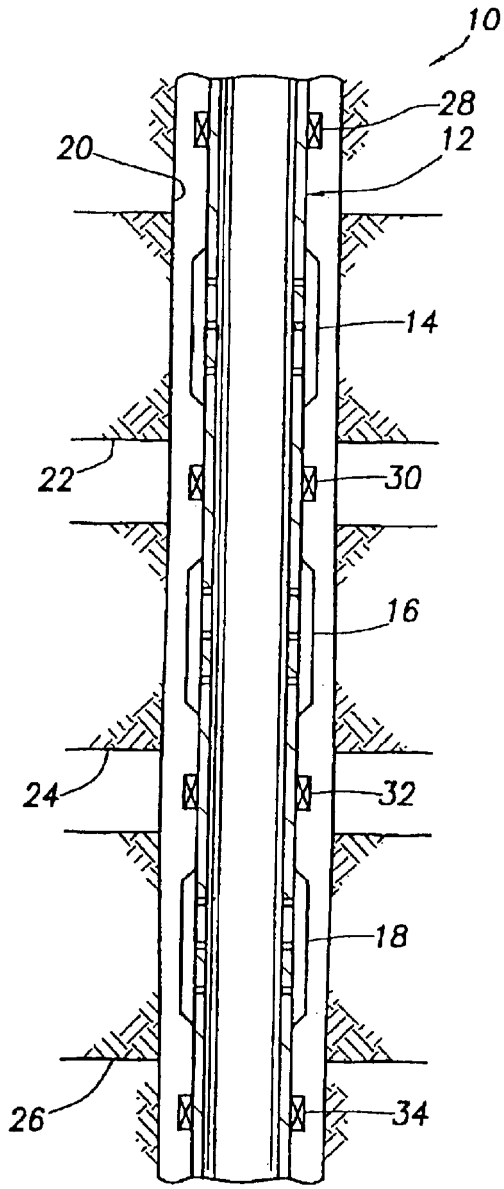
FIGS. 1A and 1B are schematic views of a method embodying principles of the present invention.
Figure 1B:
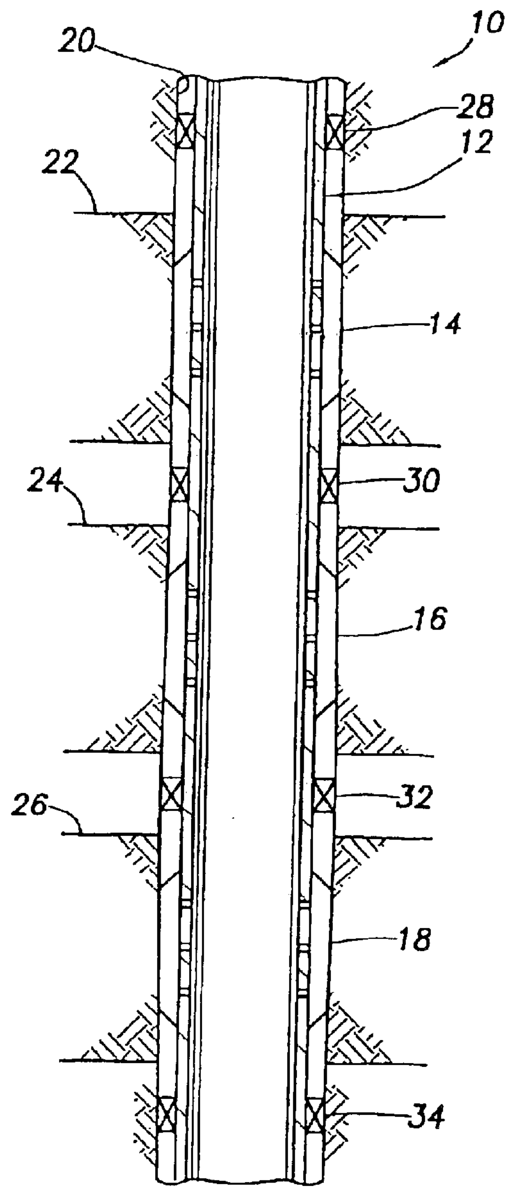

Representatively illustrated in FIGS. 1A and 1B is a method 10 which embodies principles of the present invention. In the following description of the method 10 and other apparatus and methods described herein, directional terms, such as "above", "below", "upper", "lower", etc., are used only for convenience in referring to the accompanying drawings. Additionally, it is to be understood that the apparatus representatively described herein may be utilized in various orientations, such as inclined, inverted, horizontal, vertical, etc., and in various configurations, without departing from principles of the present invention.

Referring initially to FIG. 1A, in the method 10, a screen assembly 12 including multiple expandable well screens 14, 16, 18 is conveyed into a wellbore 20. The wellbore 20 intersects multiple formations or zones 22, 24, 26 from which it is desired to produce fluids. The screens 14, 16, 18 are positioned opposite respective ones of the zones 22, 24, 26.

The wellbore 20 is depicted in FIGS. 1A and 1B as being uncased, but it is to be clearly understood that the principles of the present invention may also be practiced in cased wellbores. Additionally, the screen assembly 12 is depicted as including three individual screens 14, 16, 18, with only one of the screens being positioned opposite each of the zones 22, 24, 26, but it is to be clearly understood that any number of screens may be used in the assembly, and any number of the screens may be positioned opposite any of the zones, without departing from the principles of the present invention. Thus, each of the screens 14, 16, 18 described herein and depicted in FIGS. 1A and 1B may represent multiple screens.

Sealing devices 28, 30, 32, 34 are interconnected in the screen assembly 12 between, and above and below, the screens 14, 16, 18. The sealing devices 28, 30, 32 and 34 could be packers, in which case the packers would be set in the wellbore 20 to isolate the zones 22, 24, 26 from each other in the wellbore. However, the sealing devices 28, 30, 32, 34 are preferably expandable sealing devices, which are expanded into sealing contact with the wellbore 20 when the screen assembly 12 is expanded as described in further detail below. For example, the sealing devices 28, 30, 32, 34 may include a sealing material, such as an elastomer, a resilient material, a nonelastomer, etc., externally applied to the screen assembly 12.

Referring additionally now to FIG. 1B, the screen assembly 12 has been expanded radially outwardly from its initial FIG. 1A configuration. The sealing devices 28, 30, 32, and 34 now sealingly engage the wellbore 20 between the screens 14, 16, 18, and above and below the screens.

Additionally, the screens 14, 16, 18 preferably contact the wellbore 20 at the zones 22, 24, 26. Such contact between the screens 14, 16, 18 and the wellbore 20 may aid in preventing formation sand from being produced, preventing the formation or zones 22, 24, 26 from collapsing into the wellbore, etc. However, this contact is not necessary in keeping with the principles of the present invention.

The use of an expandable screen assembly 12 has several additional benefits. For example, the radially reduced configuration shown in FIG. 1A may be advantageous for passing through a restriction uphole, and the radially expanded configuration shown in FIG. 1B may be advantageous for providing a large flow area and enhanced access therethrough.

Figure 5:
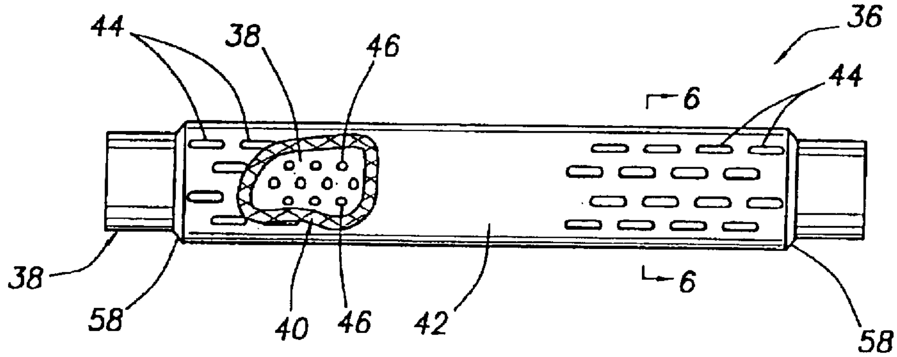
FIG. 5 is a partially cut away simplified side elevational view of the completed expandable well screen.

Referring additionally now to FIGS. 2–7, an expandable well screen 36 embodying principles of the present invention is representatively illustrated in FIG. 5. The well screen 36 may be used for one or more of the well screens 14, 16, 18 in the method 10. However, it is to be clearly understood that the well screen 36 may be utilized in any other method without departing from the principles of the present invention. Additionally, if desired, the well screen 36 may be used in a nonexpandable application without departing from the principles of the present invention.

Well screen 36 (see FIG. 5) includes a generally tubular base pipe 38 (see FIG. 4), a generally tubularly configured multi-layer filter media sheet 40 (see FIGS. 5 and 6) coaxially circumscribing and outwardly overlying the base pipe, and a generally tubular protective outer shroud 42 (see FIGS. 5 and 6) circumscribing and outwardly overlying the tubular filter media sheet 40. The shroud 42 (see FIGS. 3–6) has openings 44 formed through a sidewall thereof to admit fluid into the well screen 36. Representatively, the shroud 42 has a sidewall opening percentage in the range of from about 10 percent to about 30 percent. Preferably, this sidewall opening percentage is approximately 23 percent. Fluid passing inwardly through the shroud openings 44 is filtered by passing inwardly through the filter media 40. The fluid then flows inwardly through openings 46 formed through a sidewall of the base pipe 38 (see FIGS. 4–6).

The well screen 36 may be radially expanded utilizing any of various methods. For example, a swage may be passed through the base pipe 38, fluid pressure may be applied to a membrane positioned within the base pipe, etc. Thus, any method of expanding the well screen 36 may be used without departing from the principles of the present invention.

Outer shroud 42 protects the filter media 40 from damage while the well screen 36 is being conveyed and positioned in a well, Additionally, if the well screen 36 is used in a method, such as the method 10 previously described herein, wherein the well screen is expanded into radial contact with a wellbore, the shroud 42 also protects the filter media 40 from damage due to such contact, and provides radial support to prevent collapse of the wellbore. Thus, the shroud 42 is preferably constructed of a durable, deformable, high strength material, such as steel, although other materials may be used in keeping with the principles of the present invention.

It will be readily appreciated that, when the base pipe 38 is expanded radially outwardly, the filter media 40 will be radially compressed between the shroud 42 and the base pipe 38. Because of differential expansion between the base pipe 38 and the shroud 42, it may be difficult or otherwise undesirable to maintain alignment between the openings 44 in the shroud and the openings 46 in the base pipe. This lack of alignment between the openings 44 and 46, and compression of the filter media 40 between the shroud 42 and the base pipe 38, could severely restrict the flow of fluid into the well screen 36. However, the filter media 40 includes features which completely or substantially eliminate this potential problem.

Figure 7:
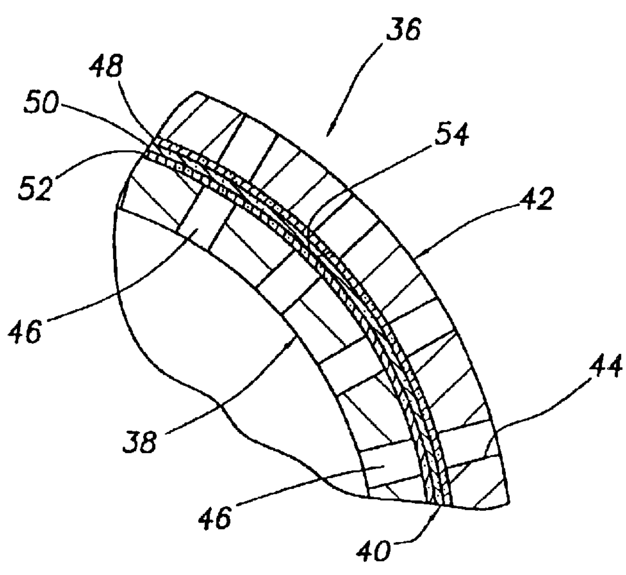
FIG. 7 is an enlarged scale simplified cross-sectional detail view of the area "7" in FIG. 6.

Specifically, as cross-sectionally illustrated in FIG. 7, the filter media 40 sandwiched between the perforated tubular base pipe 38 and the perforated tubular outer shroud 42 includes three layers of filter material—an outer relatively course layer 48, a middle relative fine layer 50, and an inner relatively coarse layer 52. The terms "fine" and "coarse" are used herein to indicate the relative size of particles permitted to pass through the filter layers 48,50,52. That is, the middle layer 50 filters fine or small-sized particles from fluid passing therethrough, while the inner and outer layers 48,52 filter coarse or larger-sized particles from fluid passing therethrough. Each layer 48,50,52 may consist of one or more individual sheets of metal mesh material.

However, the inner and outer layers 48,52 are not necessarily used for their filtering properties, although at least the outer layer 48 will filter larger-sized particles from fluid flowing into the interior of the well screen 36. Instead, they are used primarily to provide for flow between the openings 44,46 after the base pipe 38 is expanded. For example, if the filter layers 48,52 are made of a relatively coarse woven material, fluid radially entering the well screen 36 via the shroud openings 44 may relatively easily flow transversely through the layers 48–52 (i.e., generally perpendicularly to the radial direction of incoming fluid flow). Thus, fluid may flow into one of the shroud openings 44, flow transversely through the outer filter layer 48, flow inwardly through the middle filter layer 50, flow transversely through the inner filter layer 52 to one of the openings 46, and then flow inwardly through the opening 46 into the interior of the base pipe 38. Therefore, even if the filter media 40 is radially compressed between the shroud 42 and the base pipe 38, and the shroud openings 44 are not aligned with the base pipe openings 46, fluid may still flow relatively unimpeded through the filter media (other than the resistance to flow due to the relative fine middle filter layer 50).

According to a key aspect of the present invention, a unique method is utilized to fabricate the well screen 36 which provides it with a very desirable thin-walled configuration as well as reducing its complexity and fabrication cost. This fabrication method will now be described in conjunction with FIGS. 2–5.

Figure 2:
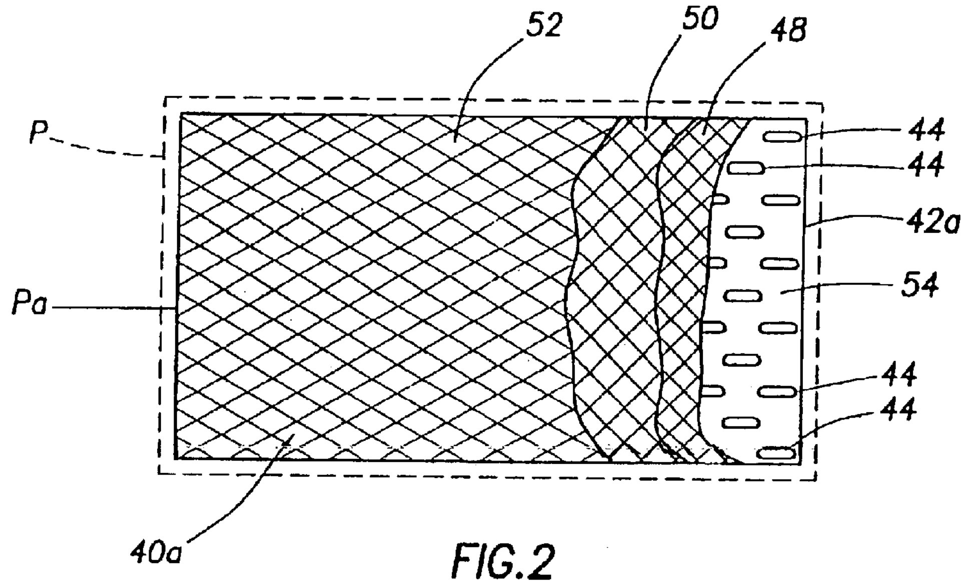
FIG. 2 is a partially cut away simplified side elevational view of a partially assembled outer filter structure used in an expandable well screen embodying principles of the present invention.

As illustrated in FIG. 2, the outer tubular shroud 42 is formed from an initially flat rectangular metal plate **42*a* having the shroud perforations 44 formed therein, and having an inner side 54. The filter media structure 40 which, in the completed well screen 36 is of a tubular configuration, is initially a stack 40*a* of individual flat rectangular metal mesh sheets placed atop the inner side 54 of the flat metal plate 42. The mesh sizes of these individual metal mesh sheets are arranged so as to define in the stack the aforementioned relatively coarse filter media layers 48,52 and the relatively fine intermediate layer 50**.

Using a suitable diffusion bonding process, these individual metal mesh sheets are simultaneously bonded to one another, and the stack of metal mesh sheets is bonded to the inner side 54 of the plate **42*a*. Alternatively, the individual sheets could be diffusion bonded to one another prior to diffusion bonding the stack to the plate 42*a*. While diffusion bonding is a preferred method of securing the filter media to the inner side 54 of the perforated plate 42*a***, other techniques could be utilized to secure the filter media to the plate, if desired, without departing from the principles of the present invention.

Preferably, the length and width dimensions of the rectangular wire mesh sheet stack **40*a* and the underlying flat perforated plate 42*a* are generally identical, and the sheet stack 40*a* is peripherally aligned with the underlying flat plate 42*a*, with the aligned peripheries of the stack and plate representatively extending along the dotted periphery line P in FIG. 2. After the diffusion bonding process has been completed, the periphery of the stack/plate subassembly is suitably trimmed from the dotted line P to the solid line periphery Pa shown in FIG. 2** to provide the plate/filter media subassembly with a finished periphery having predetermined final fabrication dimensions.

Figure 3:
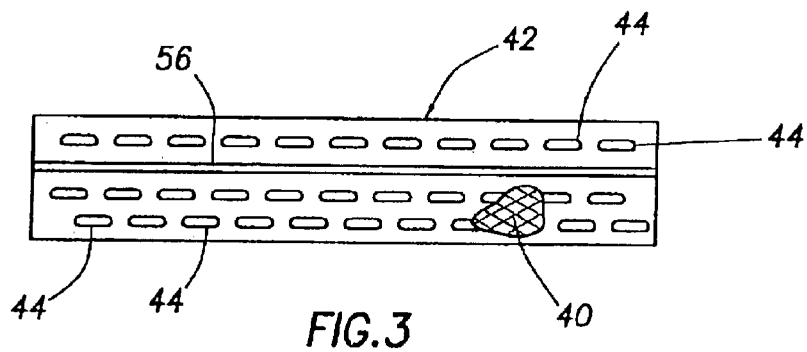
FIG. 3 is a partially cut away simplified side elevational view of the assembled outer filter structure deformed to a tubular configuration.
Figure 4:
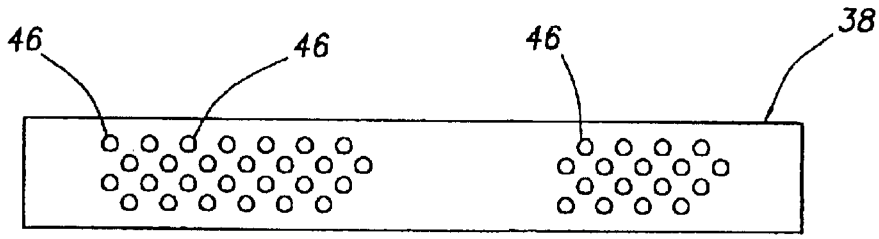
FIG. 4 is a simplified side elevational view of a perforated tubular base pipe portion of the expandable well screen.

Next, as illustrated in FIG. 3, the flat plate 42 is suitably deformed to a tubular configuration, with the filter media structure 40 secured directly to its inner side 54 now also having been deformed to a tubular configuration and being circumscribed by the now tubular outer perforated shroud 42. To retain the shroud 42 and the filter media 40 which lines its interior in their tubular configurations, a seam weld 56 is formed along the abutting side edge portions of the shroud 42 and filter media sheet 40 to thereby complete the construction of the filter media-lined perforated tubular shroud 42 shown in FIG. 3.

Figure 6:
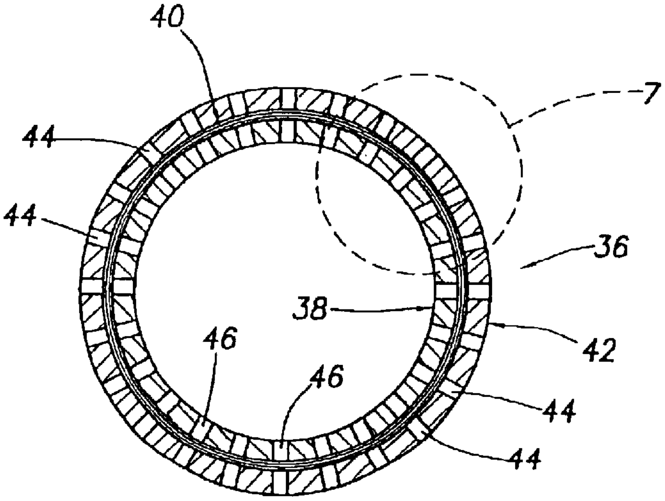
FIG. 6 is an enlarged scale simplified cross-sectional view through the completed expandable well screen taken along line 6—6 of FIG. 5.

After the fabrication of the shroud 42 is completed, the perforated tubular base pipe 38 (see FIG. 4) is telescoped into the interior of the shroud 42 (see FIGS. 5 and 6), thereby sandwiching the filter media 40 between the base pipe 38 and the shroud 42 (see FIGS. 6 and 7). The filter media-lined shroud 42 is then suitably anchored to the base pipe 38, such as by annular welds 58 (see FIG. 5) extending around the opposite ends of the shroud 42.

The securement of the filter media structure directly to the inner side 54 of the perforated shroud 42 not only simplifies and reduces the cost of fabricating the well screen 36, but also provides the screen 36 with other advantages compared to well screens of conventional constructions. For example, due to the thin wall construction of the outer filter/shroud structure 40,42 the well screen 36 may have a larger diameter perforated base pipe 38 for a given maximum outer diameter of the well screen. Thus, when the well screen 36 is radially expanded (as, for example, in the previously described method 10), the resulting base pipe flow area is increased, and the expansion stress on the base pipe is decreased, compared to a conventional, thicker walled well screen having the same unexpanded initial maximum outer diameter.

Further, since the base pipe 38 is initially of a larger diameter than that of a conventionally constructed well screen having the same maximum outer diameter, the base pipe openings 46 can be sized based primarily on drainage efficiency considerations, as opposed to having to be sized based primarily to facilitate radial expansion of the base pipe.

As previously mentioned, while the screen well 36 is representatively an expandable well screen, it may also be advantageously utilized in a variety of applications in which it need not be expanded. Additionally, while the screen 36 has been illustrated and described as being a well screen useable in a subterranean wellbore, it will readily be recognized by those of ordinary skill in the filtration art that principles of this invention could also be utilized in a variety of other filtration applications if desired.

The foregoing detailed description is to be clearly understood as being given by way of illustration and example only, the spirit and scope of the present invention being limited solely by the appended claims.

What is claimed is:

1. A method of fabricating a filtration device, the method comprising the steps of:

providing a perforated plate member having a side;

placing a sheet of filter media against the side of the perforated plate member in a parallel relationship therewith;

forming a tubular filter structure using the step of deforming the perforated plate member, and the sheet of filter media, to a tubular configuration; and telesopingly positioning a perforated tubular structure within the formed tubular filter structure.

2. The method of claim 1 further comprising the step of:

securing the sheet of filter media to the perforated plate member.

3. The method of claim 2 wherein:

the securing step is performed using a diffusion bonding process.

4. The method of claim 2 wherein:

the securing step is performed using a sheet of filter media formed from a metal mesh material.

5. The method of claim 4 wherein the securing step includes the steps of:

stacking a series of metal mesh layers on the side of the perforated plate member, and diffusion bonding the metal mesh layers to one another, and the stacked series of metal mesh layers to the side of the perforated plate member.

6. The method of claim 5 further comprising the step, performed prior to the forming step, of:

peripherally trimming the perforated plate member and stack of metal mesh layers diffusion bonded thereto.

7. The method of claim 2 wherein the securing step is performed using a sheet of filter media having an inner layer of relatively fine filter material sandwiched between inner and outer side layers of relatively coarse filter material.

8. The method of claim 1 further comprising the step of:

retaining the deformed perforated plate member and sheet of filter media in their tubular configuration.

9. The method of claim 8 wherein:

the perforated plate member has opposite side edges which are brought into close proximity in the deforming step, and the retaining step includes the step of intersecuring the opposite side edges.

10. The method of claim 9 wherein:

the perforated plate member is of a metal material, and the intersecuring step is performed by forming a seam weld along the closely proximate opposite side edges of the deformed perforated plate member.

11. The method of claim 1 further comprising the step of:

connecting the telescoped perforated tubular structure and formed tubular filter structure to one another.

12. The method of claim 1 wherein:

the providing step is performed using a perforated plate member having a sidewall open area percentage within the range of from about ten percent to about thirty percent.

13. The method of claim 1 wherein:

the providing step is performed using a perforated plate member having a sidewall open area percentage of about twenty three percent.

14. A method of fabricating a well screen for use in a subterranean wellbore, the method comprising the steps of:

forming a tubular filter structure using the steps of:

providing a perforated plate member, providing a sheet of filter media, placing the sheet of filter media against the perforated plate member in a side-to-side relationship therewith, deforming the perforated plate member, and the sheet of filter media, to a tubular configuration, and retaining the deformed perforated plate member and sheet of filter media in their tubular configuration; and positioning a perforated tubular structure and the deformed perforated plate member and sheet of filter media in a telescoped relationship with one another with the perforated tubular structure disposed within the deformed perforated plate member and sheet of filter media.

15. The method of claim 14 further comprising the step of:

securing the sheet of filter media to the perforated plate member.

16. The method of claim 15 wherein:

the securing step is performed using a diffusion bonding process.

17. The method of claim 15 wherein:

the step of providing a sheet of filter media includes the step of providing a series of individual metal mesh layers, and the securing step includes the steps of:

stacking the series of individual metal mesh layers on a side of the perforated plate member, and diffusion bonding the metal mesh layers to one another, and the stacked series of metal mesh layers to the side of the perforated plate member.

18. The method of claim 17 further comprising the step, performed prior to the deforming step, of:

peripherally trimming the perforated plate member and stack of metal mesh layers diffusion bonded thereto.

19. The method of claim 14 wherein:

the retaining step is performed by forming a seam weld on the deformed perforated plate.

20. The method of claim 14 wherein:

the step of providing a sheet of filter media is performed by providing a sheet of metal mesh material.

21. The method of claim 14 wherein the step of providing a sheet of filter media is performed by providing a sheet of filter media having an inner layer of relatively fine material sandwiched between inner and outer side layers of relatively coarse filter material.

22. The method of claim 14 wherein:

the step of providing a perforated plate member is performed by providing a perforated plate member having a sidewall open area percentage within the range of from about ten percent to about thirty percent.

23. The method of claim 14 wherein:

the step of providing a perforated plate member is performed by providing a perforated plate member having a sidewall open area percentage of about twenty three percent.

24. A method of fabricating a filtration device, the method comprising the steps of:

providing a perforated plate member having a separate filtration structure extending along a side surface thereof;

deforming the perforated plate member, and the filtration structure, to a tubular configuration and telescopingly positioning a perforated tubular structure within the deformed perforated plate member and filtration structure.

25. The method of claim 24 further comprising the step of:

retaining the deformed perforated plate member and filtration structure in their tubular configuration.

26. The method of claim 24 further comprising the step of:

connecting the telescoped perforated tubular structure and deformed perforated plate member to one another.

* * * * *